(12) United States Patent
Melamed et al.

(10) Patent No.: US 8,082,331 B2
(45) Date of Patent: Dec. 20, 2011

(54) OPTIMIZED MULTICASTING USING AN INTEREST-AWARE MEMBERSHIP SERVICE

(75) Inventors: Roie Melamed, Haifa (IL); Yoav Tock, Nesher (IL)

(73) Assignee: International Business Machines Corporation, Armonk, NY (US)

(*) Notice: Subject to any disclaimer, the term of this patent is extended or adjusted under 35 U.S.C. 154(b) by 268 days.

(21) Appl. No.: 12/419,316

(22) Filed: Apr. 7, 2009

(65) Prior Publication Data
US 2010/0257282 A1  Oct. 7, 2010

(51) Int. Cl.
*G06F 15/16* (2006.01)
(52) U.S. Cl. ......... 709/220; 709/201; 709/203; 709/204
(58) Field of Classification Search ................... 709/201, 709/203, 204, 220
See application file for complete search history.

(56) References Cited

U.S. PATENT DOCUMENTS

| | | | |
|---|---|---|---|
| 7,818,402 B1* | 10/2010 | Zhang | 709/219 |
| 2008/0198850 A1* | 8/2008 | Cooper et al. | 370/392 |
| 2008/0209054 A1* | 8/2008 | Zhang et al. | 709/228 |
| 2008/0287058 A1* | 11/2008 | Nahm et al. | 455/3.02 |
| 2009/0234917 A1* | 9/2009 | Despotovic et al. | 709/204 |

OTHER PUBLICATIONS

Y. Tock, N. Naaman, A. Harpaz, and G. Gershinsky. Hierarchical clustering of message flows in a multicast data dissemination system. In 17th IASTED Int'l Conf. Parallel and Distributed Computing and Systems, 2005.

H. Liu, V. Ramasubramanian, and E. G. Sirer. Client behavior and feed characteristics of rss, a publish-subscribe system for web micronews. In IMC, 2005.

Stoica, I., Morris, R., Karger, D., Kaashoek, M. F., and Balakrishnan, H. Chord: A Scalable Peer-to-peer Lookup Service for Internet Applications, ACM SIGCOMM 2001, San Deigo, CA, Aug. 2001, pp. 149-160.

El-Ansary, S., Alima, L. O., Brand, P., Haridi, S., Efficient Broadcast in Structured P2P Networks. In the 2nd International Workshop on Peer-to-Peer Systems (IPTPS '03), Berkeley, CA, USA.

Gregory Chcokler, Roie Melamed, Yoav Tock, Roman Vitenberg. SpiderCast: A Scalable Interest-Aware Overlay for Topic-Based Pub/Sub Communication. In the 1st Inaugural International Conference on Distributed Event-Based Systems (DEBS), Jun. 2007, Toronto, Canada.

M. Castro, P. Druschel, A-M. Kermarrec and A. Rowstron, "SCRIBE: A large-scale and decentralized application-level multicast infrastructure", IEEE Journal on Selected Areas in Communications (JSAC) (Special issue on Network Support for Multicast Communications) 2002.

\* cited by examiner

*Primary Examiner* — Djenane Bayard (57) ABSTRACT

A communications network with a structured overlay in which client nodes are interlinked to define a ring uses an interest-aware membership service to identify which client nodes are subscribed to a topic. One of the client nodes in a segment of the ring is designated to be a content-provider node, and a message concerning the topic is communicated to the node. The segment is divided into subsegments. At least one subsegment is redefined by using the interest-aware membership service to assign an outermost subscribing client node to serve as the respective terminal node of the subsegment. The message is broadcast from the content-provider node to the terminal node of the redefined subsegment. The steps of designating, communicating, dividing, redefining and broadcasting are recursively performed, using the subsegment as the segment.

20 Claims, 6 Drawing Sheets

OPTIMIZED MULTICASTING USING AN INTEREST-AWARE MEMBERSHIP SERVICE

BACKGROUND OF THE INVENTION

The present invention relates generally to the field of publication/subscription in a distributed electronic network, and specifically to optimization of publication using an interest-aware overlay in a peer to peer publication/subscription operation over an electronic network.

In a peer to peer (P2P) network, a peer can communicate with other peers directly. Each peer typically includes client and server functionality. For example, a first peer may act as a client when sending a message to a second peer. The second peer may perform a function as a result of receiving the message and may return a response message to the first peer. Thus, the second peer acts as a server for the first peer.

Publication/subscription (pub/sub, sometimes referred to as "public/subscribe") is a paradigm for supporting many-to-many communication in a distributed system. In a topic-based pub/sub system, messages or events are published by a content provider on abstract event channels called topics. Users interested in receiving messages published on a topic may send a subscription request to specify their topic or topics of interest. The topic-based pub/sub system then distributes each newly published message or event to all of the users that have expressed interest in the specified topic. Topic-based pub/sub systems are commonly used to support many-to-many communication in a wide variety of applications, such as enterprise application integration, stock market monitoring engines, Really Simple Syndication (RSS) feeds, and on-line gaming.

SUMMARY OF THE INVENTION

An embodiment of the present invention provides a computer-implemented method for optimized message multicasting, which is carried out in a communications network having a structured overlay in which client nodes are interlinked to define a ring, by using an interest-aware membership service to identify subscribing client nodes of the ring to a topic. One of the client nodes in a segment of the ring is designated as a content-provider node. A message concerning the topic is communicated to the content-provider node. The segment is divided into subsegments, and at least one of the subsegments is defined as a qualified subsegment ending at a respective terminal client node that the interest-aware membership service does not identify as a subscribing client node. The qualified subsegment is redefined by using the interest-aware membership service to assign an outermost subscribing client node of the qualified subsegment to serve as the respective terminal client node of the redefined qualified subsegment. The message is thereafter broadcast from the content-provider node to the terminal node of the redefined subsegment. The steps of designating, communicating, dividing, redefining and broadcasting are recursively performed using the qualified subsegment as the segment.

In a disclosed embodiment, a computer-implemented method is provided for optimized message multicasting to an audience, which is carried out by using an interest-aware membership service to determine an audience size. When the audience size is less than a predetermined value, a message concerning a topic is unicast to the audience. When the audience size is not less than the predetermined value, steps are performed in a communications network having a structured overlay in which client nodes are interlinked to define a ring, by using an interest-aware membership service to identify subscribing client nodes of the ring to the topic. The one of the client nodes in a segment of the ring is designated as a content-provider node. The message is communicated to the content-provider node. The segment is divided into subsegments, at least one of the subsegments defined as a qualified subsegment ending at a respective terminal client node that the interest-aware membership service does not identify as a subscribing client node. The qualified subsegment is redefined by using the interest-aware membership service to assign an outermost subscribing client node of the qualified subsegment to serve as the terminal client node of the redefined qualified subsegment. The message is thereafter broadcast from the content-provider node to the terminal client node of the redefined qualified subsegment. The steps of designating, communicating, dividing, redefining and broadcasting are recursively performed using the qualified subsegment as the segment.

Other embodiments of the invention provide computer software product and apparatus for carrying out the above-described method. Still other embodiments of the invention provide techniques for configuring a computer software product for carrying out the above-described method cooperatively with computer apparatus.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF EMBODIMENTS

Overview

Embodiments of the present invention that are described hereinbelow provide improved methods, products and systems for optimizing message multicasting. In topic-based publication/subscription systems, for example, it is a primary goal to maximize the efficiency of communication by minimizing the number of messages used to communicate a message to topic subscribers. In the context of the present patent application and claims, the term "message" refers to any communication, such as a message or event notification, associated with a topic that is published via a pub/sub system to interested subscribers. In the past, some topic-based pub/sub systems required maintenance of a message dissemination structure such as a "multicast tree" per topic. Maintenance of the structure typically required significant overhead for the performance of tasks such as sending periodic control messages to ensure that all elements of the structure were accessible.

Use of a scalable overlay, wherein an overlay is created to virtually connect nodes in a network for each topic, has been proposed as a solution. Unfortunately, solutions based upon the scalable overlay would either require unacceptable overhead or would require that each node in the network create and maintain a number of links that is proportional to the node's subscription size. That is to say, a node would have to maintain a link for each topic to which the node is subscribed, which is not feasible in the current example. Such an arrangement clearly suffers from lack of scalability, as a typical server is limited to a few hundred TCP connections.

In systems that produce very high levels of network traffic, improvements in message multicasting can help to prevent the traffic from overwhelming the ability of the systems to provide timely and reliable messages. In an embodiment of the present invention, a client node in an interval of a virtual ring of client nodes is designated as a content-provider node. In a recursive fashion, the interval is divided into sub-intervals, and an interest-aware membership service is used, as described hereinbelow, to redefine a qualified sub-interval by pruning non-subscribing client nodes from a terminus of the qualified sub-interval. The message is then broadcast to the terminal node of the redefined qualified sub-interval. As newly designated content-provider nodes iterate through the process with progressively smaller sub-intervals, the message is multicast in an optimal fashion to the redefined qualified sub-intervals, thereby decreasing the network traffic.

In an embodiment of the present invention, a large data center or a computing cloud with thousands of nodes may offer application services accessed through a structured overlay network. The structured overlay network is a virtual (or logical) overlay of connections on a physical network topology layer, which itself is typically not ring-shaped. Each node may host many applications to provide the application services, each of which is allocated a topic. The applications may be replicated at multiple nodes for performance and availability, thereby creating overlapping multicast domains. Deployment of the applications on the nodes may be dynamic and dependent upon the relative load incurred upon the nodes.

In embodiments of the invention, a server application on a content-provider node connected to a structured overlay network publishes a message concerning a topic to client nodes subscribed to the topic by using an improved broadcast operation. By using the structured overlay network, the number of links to other nodes grows as the logarithm of the total number of nodes, regardless of the number of topics or subscriptions. In the context of the present patent application and claims, the term "server application" refers to any application or process that is capable of publishing messages and processing subscription requests.

Typically, nodes are formed into the structured overlay network using networking methods well known in the art. The nodes of the network are usually configured as a virtual (or logical) ring, wherein the structured overlay network is conceptually overlaid on the actual physical network topology layer into the shape of the ring. The broadcast operation defines required message dissemination structures temporarily, thereby streamlining the topic-based pub/sub system by eliminating the need to maintain the structures after performing the broadcast operation. In the context of the present patent application and claims, a node refers to any device capable of joining the network and publishing messages or subscribing to topics, such as personal computers, network terminals, computer servers, or various types of wireless devices, such as personal digital assistants (PDA's) or cellular telephones. It will be apparent to one skilled in the art, however, that a process or application running on a node usually performs the communication activities attributed to the node, for example the server application described hereinabove. The content-provider node publishes messages concerning the topic, which are then multicast so as to be received by the client node or nodes, which have subscribed to the topic.

In embodiments of the invention, the server application defines a set of broadcast intervals comprising a series of neighboring client nodes linked point-to-point in the network. That is to say, the server application defines an interval of the ring that includes one of the client nodes. In the context of the present patent application and claims, the interval of nodes refers to a segment of the ring that is terminated by two terminal nodes to delineate the end points of the interval. An interest-aware membership service may already exist, or may need to be created by the server application, wherein topic subscriptions are determined for the client nodes. That is to say, the membership service may be used to identify non-subscribing nodes to the topic. In the context of the present patent application and claims, an interest-aware membership service is a service that provides each node in the network with a view of the interests of the other nodes. The interest delineates a set of topics to which the node is subscribed. In the present example, the service is a full-view service, whereby all nodes are provided with the view of the interests of all other nodes in the network.

One of the client nodes in the network is designated the content-provider node, wherein the client node takes on the role and is thus responsible for publishing the message to other client nodes in the network. The server application divides the intervals into sub-intervals, wherein each of the sub-intervals includes at least one client node and has at least one terminal client node that the interest-aware membership service fails to identify as a subscribing client node. The server application redefines a qualified sub-interval using the interest-aware membership service to determine the outermost subscribing client node within the qualified sub-interval as the terminal node, thus causing the redefined qualified sub-interval to comprise a smaller number of client nodes.

The server application broadcasts the message from the content-provider node to the terminal node of the redefined qualified sub-interval, thereby minimizing the number of messages used to communicate the message to topic-subscribing client nodes. The steps are performed recursively using the present optimized multicasting method until the message has been communicated to the client nodes of the redefined qualified sub-intervals of the network, whether or not they are topic-subscribing client nodes. Additionally or alternatively, the content-provider node may employ other multicasting methods from time to time.

System Description

Figure 1:
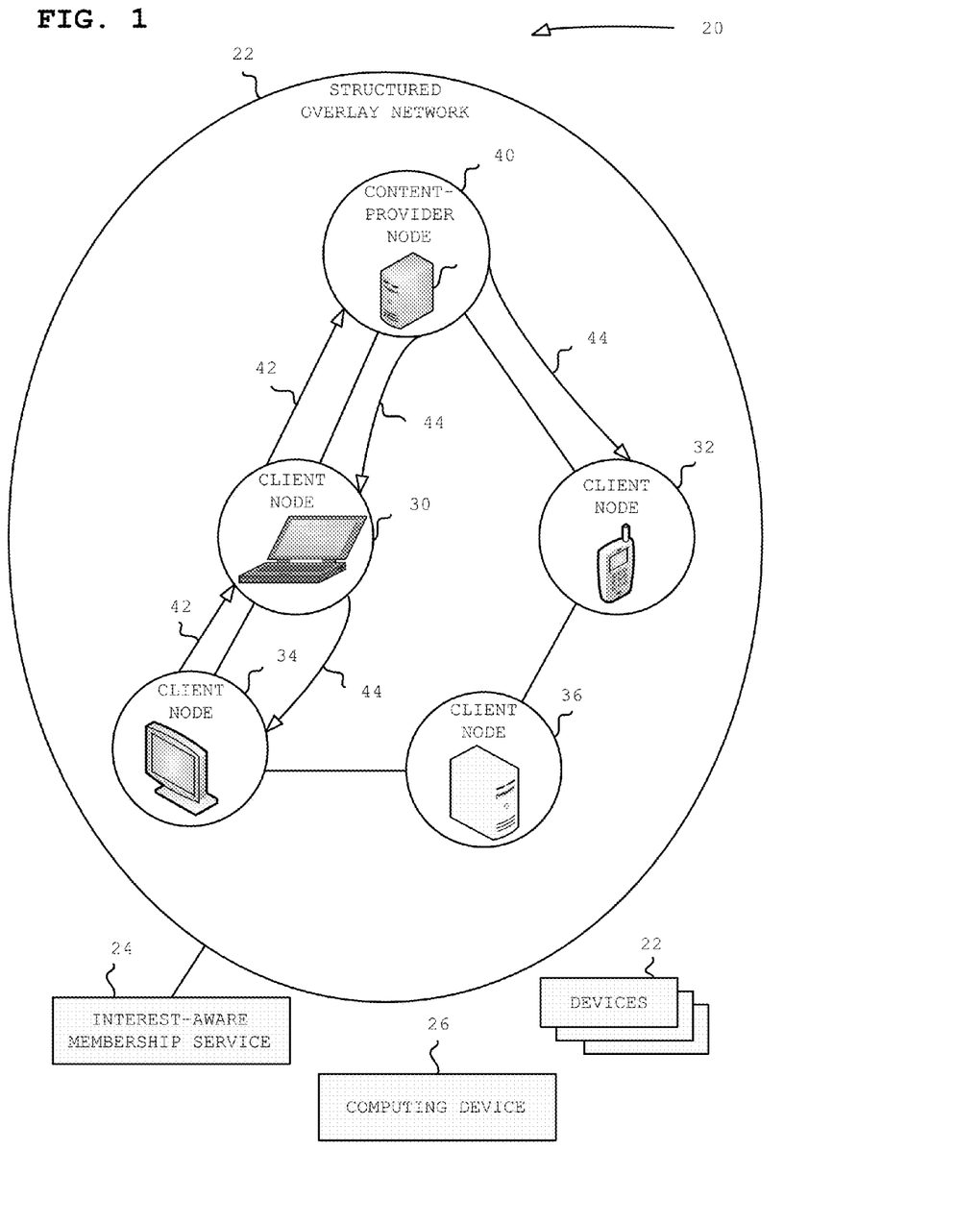
FIG. 1 is a block diagram that schematically illustrates a system for optimized multicasting of messages in a structured overlay network using an interest-aware membership service, in accordance with an embodiment of the present invention.

Reference is now made to FIG. 1, which is a block diagram that schematically illustrates a system 20 for optimized multicasting of messages in a structured overlay network 22 using an interest-aware membership service 24, in accordance with an embodiment of the present invention. System 20 comprises structured overlay network 22, one or more client nodes 30, 32, 34, 36, a content-provider node 40 and interest-aware membership service 24. Network 22 is an "overlay" in the sense of being a virtual, logical graph structure that is overlaid on a given physical network, such as the Internet. In a "structured" overlay network, nodes join the overlay according to a specific protocol. One or more client nodes 30, 32, 34, 36 and content-provider node 40 are typically formed into the shape of a ring by structured overlay network 22 via methods known in the art, such as those described in a document by Stoica et al., entitled "Chord: A Scalable Peer-to-peer Lookup Service for Internet Applications" (ACM SIGCOMM 2001). In structured overlay network 22, nodes (e.g. client node 30, content-provider node 40) maintain O(log N) connections to other nodes, where N is the number of nodes in structured overlay network 22.

Structured overlay network 22 supports both point-to-point routing and multicast communication between nodes in an efficient manner. That is to say, messages can be sent from, for example, content-provider node 40 to one of client nodes 30, 32, 34, 36 using point-to-point routing to transmit a message to a single destination node, typically used when publishing a message for topics with a small audience of client nodes. Point-to-point routing via structured overlay network 22 ensures that a maximum of O(log N) hops are made by messages sent between any two nodes. Alternatively, for topics with large audiences of client nodes, messages can be multicast from content-provider node 40 via structured overlay network 22 to multiple ones of client nodes 30, 32, 34, 36 simultaneously via a multicasting operation as will be described hereinbelow.

One or more client nodes 30, 32, 34, 36 send a subscription request 42 using any method known in the art to content-provider node 40, which is adapted to receive subscription requests such as subscription request 42 and to publish a message 44 concerning the topic to client nodes subscribed to the topic, such as client node 34. Topic-subscribing client nodes are sometimes referred to herein as subscribing client nodes.

An additional membership protocol (not shown) deployed on top of the overlay of structured overlay network 22 provides interest-aware membership service 24 to all nodes in the network. Interest-aware membership service 24 maintains knowledge about each node in structured overlay network 22 and its respective interest, as proposed in a paper by Chockler et al., entitled "SpiderCast: A Scalable Interest-Aware Overlay for Topic-Based Pub/Sub Communication" (1st Inaugural International Conference on Distributed Event-Based Systems, 2007). Although interest-aware membership service 24 is shown, for the sake of clarity of explanation, as a part of structured overlay network 22 in FIG. 1, interest-aware membership service 24 may alternatively be provided separately.

System 20 includes one or more devices 21 for producing a software product on a computer-readable medium, for example a CD or DVD writer. Devices employing many other technologies are also suitable for use as devices 21, for example, writers adapted to tapes, hard disc drives, RAM, ROM, flash memory devices, floppy drives, programmable read-only memory (PROM), erasable programmable read-only memory (EPROM), and magneto-optical discs. In all of these technologies patterns or transitions in the physical state of the medium are formed therein. These patterns and sequences of transitions encode instructions or data, e.g., binary numbers that are acceptable to the processor. The nature of the state transitions varies with the particular medium, and includes changes in magnetic domains in magnetic media, formation of pits or bumps on an optical disk, etc. Once the transitions are established, the medium may be transferred to another computing device 23, which is capable of reading the medium, recognizing the transitions, and decoding them to identify executable instructions or data.

Node Features

Figure 2:
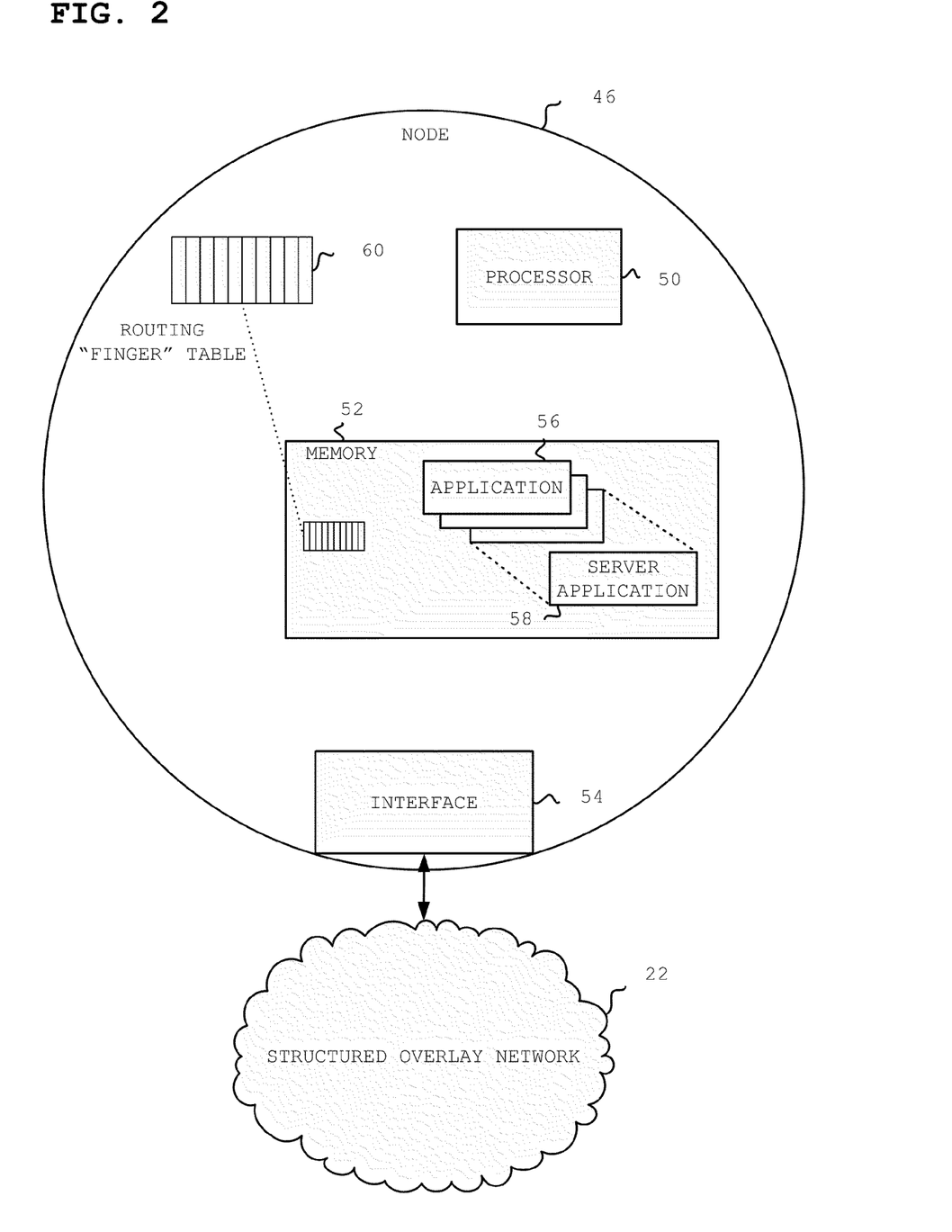
FIG. 2 is a block diagram that schematically illustrates a node in a structured overlay network, in accordance with an embodiment of the present invention.

Reference is now made to FIG. 2, which is a block diagram that schematically illustrates a node in a structured overlay network, in accordance with an embodiment of the present invention. As described hereinabove, nodes may comprise many types of devices. Furthermore, each node 46 comprises a processor 50, a memory 52, and a communications interface 54. Applications 56 are held in memory 52 and run on processor 50. Applications 56 are each allocated a topic, and offer a variety of application services that are accessed through structured overlay network 22. Memory 52 stores a specialized module, referred to herein as a server application 58, which processor 50 is programmed to access and execute. Server application 58 is shown, for the sake of clarity of explanation, as separate from applications 56 in FIG. 2, as the application publishing the message on the topic in the present example. However, all of applications 56 are capable of publishing messages to their subscribers in structured overlay network 22 using the same method described hereinbelow.

A routing table, typically referred to as a finger table 60, is also held in memory 52. Finger table 60 contains a number of entries that grow as the logarithm of the number of nodes, each entry holding a link to another node in structured overlay network 22. The entries are used when determining where to send broadcast messages as described hereinbelow and to provide alternative message routes in case of node failure. Use of finger table 60 in structured overlay network 22 is well known from the above-noted Stoica et al. document.

Interface 54 may comprise a Bluetooth® adapter, an Infrared Data Association (IrDA) device, a cable connection, or any communication interface that is known to those skilled in the art and which allows node 46 to communicate with other nodes in structured overlay network 22.

Efficient Multicasting Over a Structured Overlay Network

Figure 3:
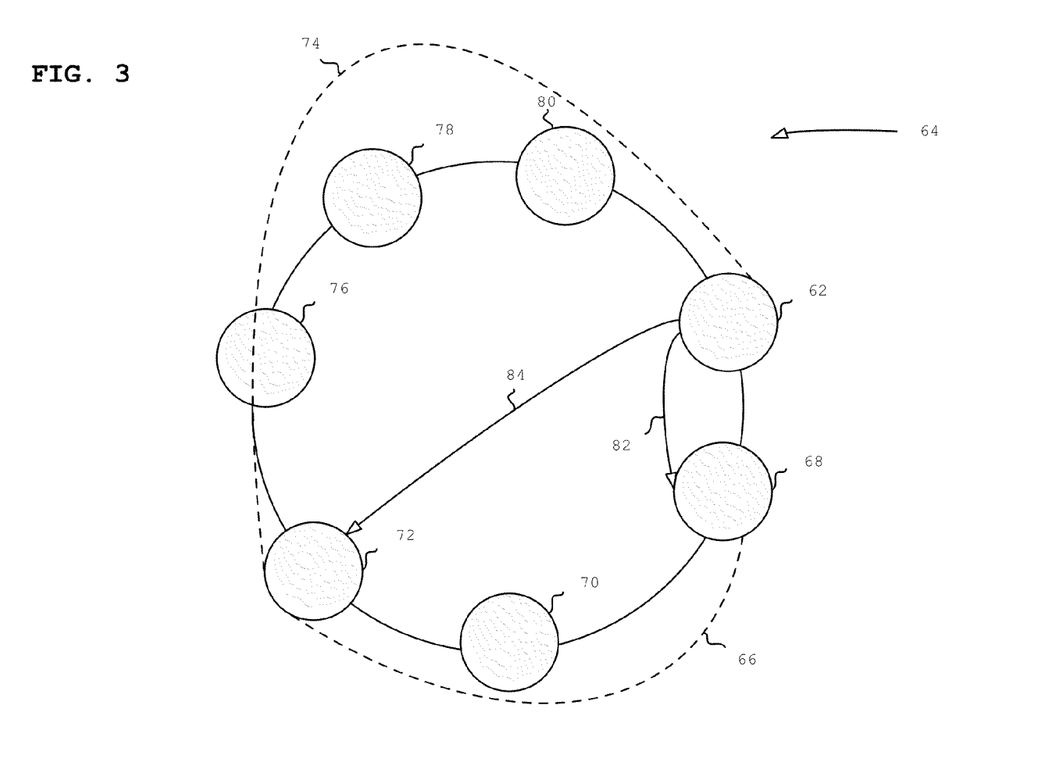
FIG. 3 is a block diagram that schematically illustrates a first stage of a multicast operation over a structured overlay network, in accordance with an embodiment of the present invention.

Reference is now made to FIG. 3, which is a block diagram that schematically illustrates a first iterative stage of a multicast operation over a structured overlay network, in accordance with an embodiment of the present invention. Efficient multicast communication may be provided by using an algorithm introduced in a document by El-Ansary, S. et al., entitled "Efficient Broadcast in Structured P2P Networks" (2nd International Workshop on Peer-to-Peer Systems, 2003).

The algorithm is illustrated in FIG. 3 via an example wherein a content-provider node 62 is required to send a message to all of the client nodes in a structured overlay network 64. Content-provider node 62 divides a logical ring formed by structured overlay network 64 into two approximately equal halves by identifying the client node most proximate the midpoint of the ring using the following equation:

$$\text{Node}_{mid} = \text{Successor}(id + 2^{m-1}) \tag{1}$$

where Successor is a function that identifies the next node in the ring moving clockwise, id is a hashed node identity having a value between 0 and $2^{m-1}$ (typically, m has a value between 64 and 160,) and identifies content-provider node 62 in the current example. Use of the Successor function and node identity assignment in structured overlay network 64 is known from the above-noted Stoica et al. document.

Content-provider node 62 defines a set of broadcast intervals, each encompassing approximately half of the nodes in structured overlay network 64. A first broadcast interval 66 is defined, from client node 68 (Successor(id)) to client node 72 (Node$_{mid}$). First broadcast interval 66 may be denoted as (id, Node$_{mid}$), whereby the notation describes an open interval from id to Node$_{mid}$ that does not include either terminal node. That is to say, first broadcast interval 66 comprises a set of neighboring client nodes 68 and 70, although the convention is to show first broadcast interval 66 as connected to client node 72. In the context of the present patent application and claims, neighboring nodes in the interval are nodes that have direct point-to-point linkage. A second interval 74 is also defined, from Successor(Node$_{mid}$) to id. Second interval 74 may be denoted as (Node$_{mid}$, id], whereby the notation describes an interval closed at Node$_{mid}$, including one terminal node, and open at id, thus excluding the second terminal node. That is to say, second interval 74 comprises another set of client nodes 72, 76, 78, 80.

The first iterative stage of the multicast operation is completed when content-provider node 62 sends a first copy 82 of the message to the nearest terminal client node in first broadcast interval 66, and a second copy 84 of the message to the terminal client node in second interval 74. In the present example, first copy 82 of the message is sent to client node 68, and second copy 84 is sent to client node 72.

Figure 4:
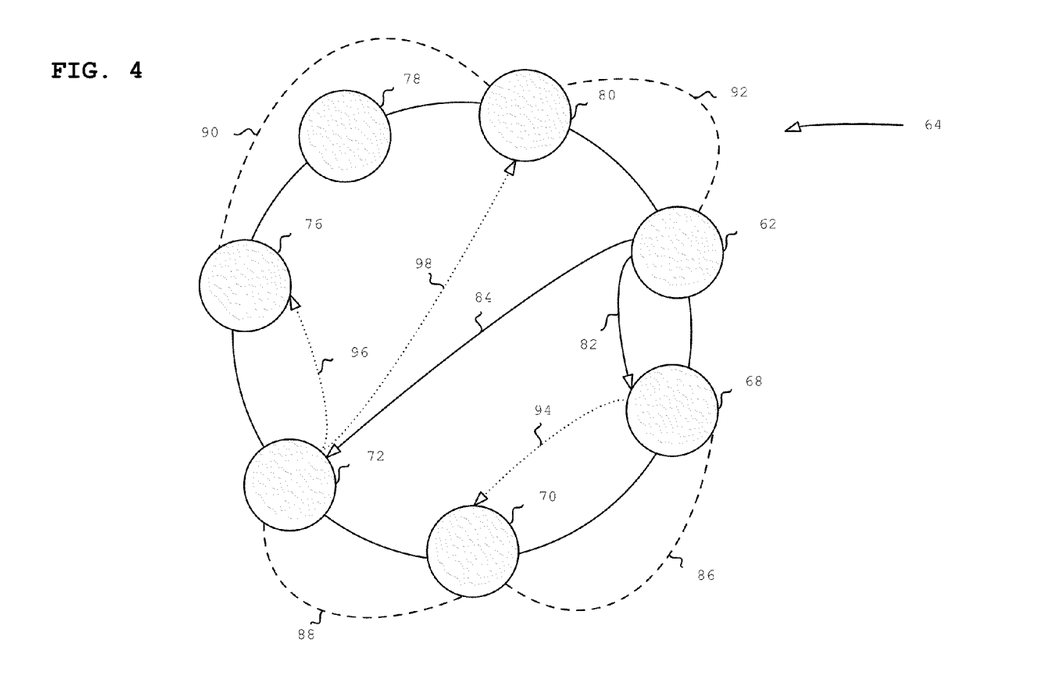
FIG. 4 is a block diagram that schematically illustrates a next stage of a multicast operation over a structured overlay network, in accordance with an embodiment of the present invention.

Reference is now made to FIG. 4, which is a block diagram that schematically illustrates a next stage of a multicast operation over a structured overlay network, in accordance with an embodiment of the present invention. It will be apparent from the discussion that follows that the process is recursive in nature. After receiving a copy of the message, the client node takes on the role of the content-provider node. Continuing the current example, client node 68 is responsible for sending the message to the client nodes delineated by first broadcast interval 66 (FIG. 3), and client node 72 is responsible for sending the message to the client nodes specified by second interval 74 (FIG. 3).

In the next stage of the multicast operation, client node 68 (FIG. 3), which received first copy 82 from content-provider node 62, divides the logical arc delineated by first broadcast interval 66 (FIG. 3) into two approximately equal halves by identifying the client node most proximate the midpoint, typically by choosing the client node from finger table 60 (FIG. 2). Finger table 60 is typically constructed using an optimization of Equation 1 to store the client mode most proximate the midpoint in a specific table location. In the present example, the Node$_{mid}$ of the nodes in first broadcast interval 66 is client node 70. In identical fashion, client node 72, which received second copy 84, selects client node 80 from finger table 60 as most proximate the midpoint of second interval 74 (FIG. 3).

Client node 68 (FIG. 3) next defines a set of broadcast intervals, each of which is a sub-interval of first broadcast interval 66, and encompasses approximately half of the nodes in first broadcast interval 66 (FIG. 3). Client node 68 follows the principles described hereinabove to define a first sub-interval 86 and a second sub-interval 88. In similar fashion, client node 72 defines a third sub-interval 90 and a fourth sub-interval 92.

The next stage of the multicast operation is completed when client node 68 sends a third copy 94 of the message to the first node in first sub-interval 86, client node 70, and client node 72 sends a fourth copy 96 and a fifth copy 98. Only one message is sent by client node 68, as the nodes delineated by second sub-interval 88 have all received a copy of the message. In the present example, one additional stage is necessary to complete the multicast operation, wherein client node 76 defines an additional sub-interval and sends a copy of the message to client node 78. Thus, iteration of the stages of the multicast operation ensures that all client nodes in structured overlay network 64 receive a copy of the message that was multicast by content-provider node 62.

According to the above-noted Ansary et al. document, the multicast algorithm described therein provides the message to all of the client nodes in the absence of failures. Additionally, the multicast operation incurs the sending of a maximum of N messages, while taking a maximum of O(log N) hops, where N is the number of nodes in structured overlay network 64. Failures can be overcome when using the algorithm by using the links in different finger tables of the nodes, as is well known from the above-noted Stoica et al. document. Those having ordinary skill in the art will be able to adapt the process for multicast operation described herein, mutatis mutandis, to scenarios wherein messages are broadcast from content provider nodes to client nodes in structured overlay networks having different configurations than structured overlay network 64.

Reducing Publication Overhead Using an
Interest-Aware Membership Service

Figure 5:
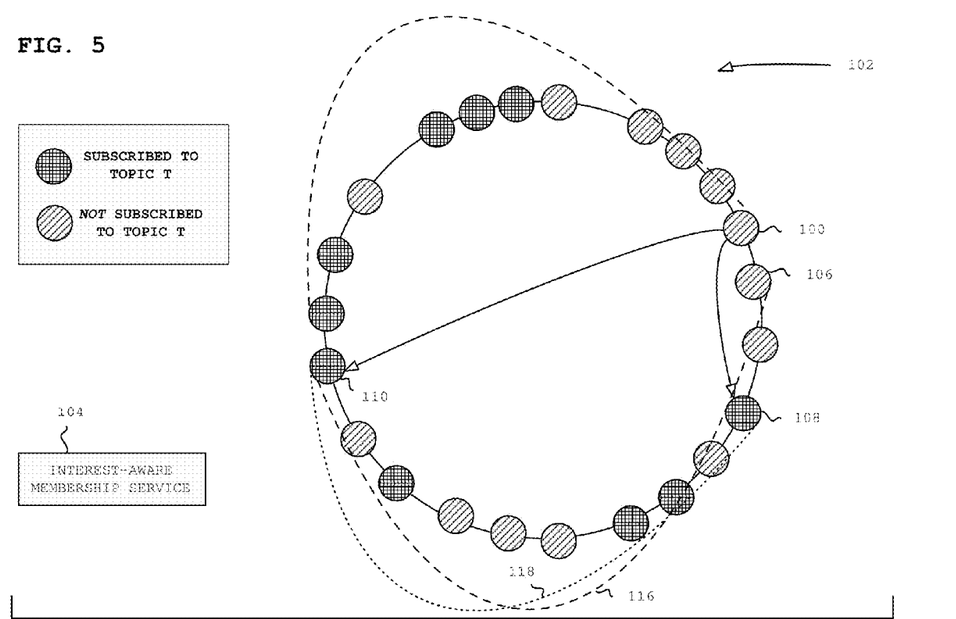
FIG. 5 is a block diagram that schematically illustrates an optimized multicast operation using an interest-aware membership service to reduce overhead, in accordance with an embodiment of the present invention.

Reference is now made to FIG. 5, which is a block diagram that schematically illustrates an optimized multicast operation using an interest-aware membership service to reduce overhead, in accordance with an embodiment of the present invention. FIG. 5 depicts a structured overlay network 102 and an interest-aware membership service 104. Structured overlay network 102 comprises content-provider node 100 and any number of client nodes may be present, shown representatively as client nodes 106, 108, and 110.

Optimizing a multicast operation by using interest-aware membership can be accomplished using an algorithm shown as pseudo code in Listing 1. Qualified sub-intervals are redefined, pruned at their endpoints by using interest-aware membership service 104 to eliminate non-subscribing client nodes, thus decreasing the number of client nodes the qualified sub-intervals encompass. That is to say, using the algorithm, the optimized multicast operation prevents messages from being sent to non-subscribing client nodes that occur at a terminus of the qualified sub-intervals. The message is only sent to client nodes that lie within the redefined qualified sub-intervals, which now comprise fewer client nodes.

After the broadcast intervals are defined, and the sub-intervals have been divided as described hereinabove, the designated content-provider node or client node that has received the message redefines qualified sub-intervals by using interest-aware membership service 104 to determine the outermost subscribing client node or nodes, i.e., the subscribing client node or nodes closest to a respective terminal node of the sub-interval, and redefines the qualified sub-interval accordingly. In the present example, content-provider node 100 divides an interval into broadcast sub-interval 116, which includes client node 106, which interest-aware membership service 104 has failed to identify as a subscribing client node, and is thus qualified to be redefined. Content-provider node 100 establishes a redefined sub-interval 118 by determining the outermost subscribing client node within redefined sub-interval 118 as the terminal node. In the current example, content-provider node 100 moves in a clockwise direction around the ring of structured overlay network 102 until reaching a client node that subscribes to the topic. The direction is shown as clockwise in this example, but it need not be so. In the current example, content-provider node 100 establishes redefined sub-interval 118 with one terminus at client node 108 and the other at client node 110. Content-provider node 100 broadcasts the message to the terminal nodes of redefined sub-interval 118, which now exclude at least one non-subscribing client node and thus the multicast operation is optimized to require less messages than the multicast operation described hereinabove in association with FIG. 4.

Optimized Message Multicasting

Figure 6:
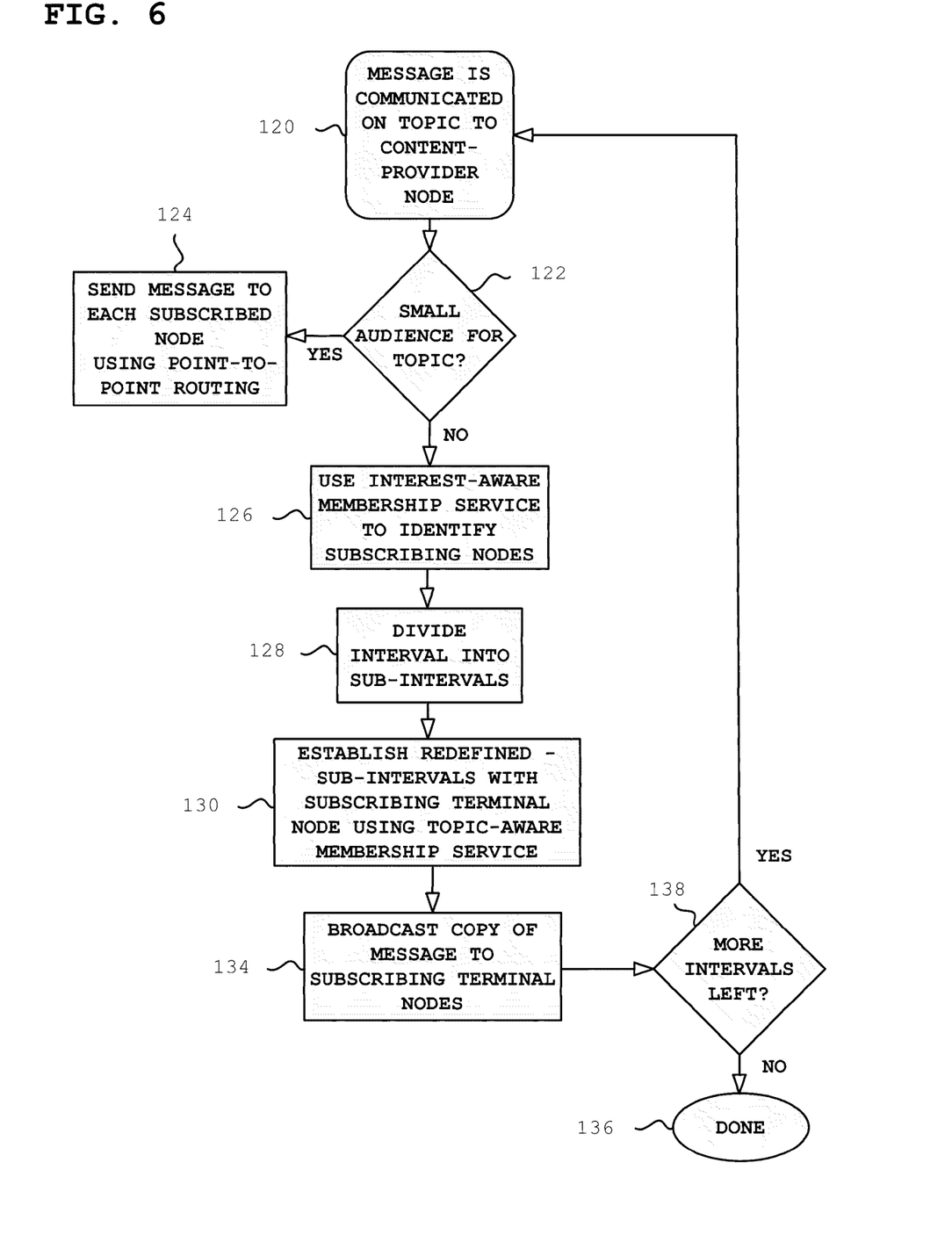
FIG. 6 is a flow chart that schematically illustrates a method for optimizing message publication over a structured overlay network using an interest-aware membership service, in accordance with an embodiment of the present invention.

Reference is now made to FIG. 6, which is a flow chart that schematically illustrates a method for optimizing message publication over a structured overlay network using an interest-aware membership service, in accordance with an embodiment of the present invention. Server application 58 (FIG. 2) causes processor 50 to multicast a message in structured overlay network 102 (FIG. 5) to representative client nodes 108, 110, and to perform the steps listed hereinbelow. A message on a topic is communicated to server application 58 for publication by one or more client nodes, for example client nodes 106, 108, 110, in a message communication step 120. The client nodes receiving the message take on the role of content-provider node 100, respectively, for sub-intervals to be defined, as explained below.

In an audience size decision step 122, server application 58 decides whether the audience size is small, i.e., whether the total number of nodes subscribed to the topic is less than some configured value. Audience size decision step 122 is typically performed by querying interest-aware membership service 104. If server application 58 determines that the audience size is small, for example less than 20 subscribed nodes, server application 58 sends copies of the message to each subscribed node using point-to-point routing in a small audience message sending step 124. The publication cost of sending copies of the message to each subscribed node using point-to-point routing is |T| O(log N) messages, where |T| is the audience size and where N is the number of nodes in structured overlay network 102.

If the audience size is larger than the configured value, server application 58 invokes interest-aware membership service 104 (FIG. 5) to identify subscribing client nodes in an interest-aware membership service using step 126, as introduced in the above-noted Chockler et al. paper.

An interval of the ring including at least one of the client nodes is defined, and is divided into sub-intervals by server application 58 as described hereinabove in reference to FIG. 4 in a broadcast interval defining step 128. Use of the algorithm introduced in the above-noted El-Ansary et al. document described hereinabove is employed to divide the client nodes in structured overlay network 102 into qualified sub-intervals in a sub-interval dividing step 128 in order to support the efficient multicast operation. Each of the qualified sub-intervals has at least one terminal client node that interest-aware membership service 104 fails to identify as a subscribing client node, for example client node 106 (FIG. 5).

Server application 58 redefines the qualified sub-intervals by using interest-aware membership service 104 to determine the outermost subscribing client node within the qualified sub-interval as the terminal node in a redefined sub-interval establishing step 130. In the present example, server application 58 establishes redefined sub-interval 118 for use in communication rather than broadcast sub-interval 116, as described hereinabove. While the current example uses one algorithm for identifying the non-subscribing client nodes from the terminus of broadcast sub-interval 116, the method may alternatively be carried out using other identifying and defining algorithms. For example, instead of beginning at the first (or nearest) terminus clockwise from the node in the ring of structured overlay network 102, the terminus farthest from the current node in broadcast sub-interval 116 (e.g., client node 110) could be used for redefining qualified sub-intervals with subscribing nodes at the terminus.

A copy of the message is broadcast by server application 58 to the terminal nodes of the redefined qualified sub-intervals, in a message broadcasting step 134. By performing redefined sub-interval establishing step 130, server application 58 ensures that the client node at the terminus of the interval is a subscribing client node. Note that all client nodes may be deleted from an interval if all are non-subscribing to the topic associated with the message. A copy of the message is communicated from the terminal node to each of the neighboring nodes in the interval using any method known in the art.

In a remaining intervals decision step 138, server application 58 decides if any intervals are left in structured overlay network 102. When there are remaining intervals, the method returns to redefined sub-interval establishing step 130. Otherwise, recursion ends, and the method terminates at a final step 136. It will be understood that the term "recursion" is used for purposes of exposition. In an efficient implementation actual recursion may be avoided. Furthermore, many of the steps shown above may be performed concurrently.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code stored in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flow chart illustrations and/or block diagrams of methods, apparatus (systems) and computer program products according to embodiments of the invention. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow charts and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flow charts and/or block diagram block or blocks.

The flow charts and block diagrams in the Figures illustrate the architecture, functionality, and operation of possible implementations of systems, methods and computer program products according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustrations, and combinations of blocks in the block diagrams and/or flow chart illustrations, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

Computer Program Listings

Listing 1

```
procedure pointToPointRouting (message m, target id: target_id)
{
    from the finger table and the successor list, find
the node p that has the closest id to target_id among the
nodees that have an id that is smaller than target_id
        send the message to p
}
procedure publish (message: m, topic: T, topic size: |T|,
number of nodees: N, subscriber set: subscribers, source
id: id)
{
    if (|T| log (N) < N-1)
    {    // In this case, the pub/sub is implemented in
series of point-to-point communication.
        foreach subscriber in subscribers
        //send point-to-point message m to subscriber
(using the point-// to-point routing described above)
            pointToPointRouting(message
<Protocol: point-to-point, message: m, topic: t, target:
subscriber>, target: subscriber)
    }
    else
    {    //In this case, the pub/sub is implemented using
broadcast with pruning.
forwardPubSubMessageUsingBrodcastWithPruning(m,T,(id,id))
    }
}
procedure
forwardPubSubMessageUsingBrodcastWithPruning(message: m,
topic: T, interval (e1, e2))
{
    if (the local node is subscribed to topic T)
    {
        deliver m to the local application;
    }
    // Divides the interval (e1, e2) to two equal
halves using the finger table
        Denote B as the node from the finger table that
best divides the interval to two equal halves, i.e., a node
B so that |(B,e2) – (e1,B)| is minimized
        send message <broadcast with pruning, message: m,
topic: T, interval: (B,e2), target B > to B
        //(the message is sent directly to B since the
current node maintains a connection to node B)
        Denote A as the first node clockwise to the
current node that is subscribed to T
            pointToPointRouting (message <broadcast with
pruning, message: m, topic: T, interval: (A,B), target: A
>, A)
}
event handler upon receiving a publish/subscribe message
<Protocol: point-to-point, message: m, topic: T, target:
subscriber >
{
    if (the local node is not the target of the
message)
    {
```

-continued

Listing 1

```
            //forward m according to the point-to-point
    routing protocol that is described above
            pointToPointRouting (<Protocol: point-to-
    point, message: m, topic: T, target: subscriber >,
    subscriber)
        }
        else
        {
            if (the local node is subscribed to topic T)
            {
                deliver m to the local application
            }
        }
    }
```

The invention claimed is:

1. A computer-implemented method for optimized message multicasting, comprising:
   in a communications network having a structured overlay in which client nodes are interlinked to define a ring, designating one of the client nodes in a logical segment of the ring as a content-provider node;
   communicating a message to the content-provider node, the message being associated with a topic;
   responsively to the message, consulting an interest-aware membership service to identify a set of the client nodes in the logical segment as subscribing client nodes of the topic;
   dividing the logical segment into logical subsegments having terminal nodes;
   pruning ones of the terminal nodes that are not subscribing client nodes until the logical subsegments comprise at least one qualified logical subsegment that includes and is bounded by an outermost one of the subscribing client nodes;
   recursively performing the steps of designating one of the client nodes as a new content-provider node, dividing the logical segment into logical subsegments, and pruning, using the at least one qualified logical subsegment as the logical segment; and
   multicasting the message from the content-provider node only to instances of the new content-provider node.

2. The method according to claim 1, wherein the interest-aware membership service comprises a full-view interest-aware membership service and maintains an identity and an interest for each client node in the network, and wherein the interest comprises a set of topics to which each client node is subscribed.

3. The method according to claim 1, wherein communicating the message to the content-provider node comprises executing an application service providing the message to the content-provider node for publication.

4. The method according to claim 1, wherein dividing the logical segment into logical subsegments comprises defining a first logical subsegment, a second logical subsegment and a logical midpoint forming a boundary therebetween, wherein equal numbers of client nodes are found in the first logical subsegment and the second logical subsegment.

5. The method according to claim 1, wherein consulting the interest-aware membership service further comprises determining a number of the subscribing client nodes in the logical segment, and wherein the step of multicasting the message from the content-provider node to instances of the new content-provider node is performed only when the number exceeds a predetermined threshold, the method further comprising unicasting the message to the subscribing client nodes in the logical segment when the number fails to exceed the predetermined threshold.

6. A computer software product for optimized message multicasting, including a non-transitory computer-readable storage medium in which computer program instructions are stored, which instructions, when executed by a computer, cause the computer to perform a method comprising the steps of:
   in a communications network having a structured overlay in which client nodes are interlinked to define a ring, designating one of the client nodes in a logical segment of the ring as a content-provider node;
   communicating a message to the content-provider node, the message being associated with a topic;
   responsively to the message, consulting an interest-aware membership service to identify a set of the client nodes in the logical segment as subscribing client nodes of the topic;
   dividing the logical segment into logical subsegments having terminal nodes;
   pruning ones of the terminal nodes that are not subscribing client nodes until the logical subsegments comprise at least one qualified logical subsegment that includes and is bounded by an outermost one of the subscribing client nodes;
   recursively performing the steps of designating one of the client nodes as a new content-provider node, dividing the logical segment into logical subsegments, and pruning, using the at least one qualified logical subsegment as the logical segment; and
   multicasting the message from the content-provider node only to instances of the new content-provider node.

7. The computer software product according to claim 6, wherein the interest-aware membership service comprises a full-view interest-aware membership service and maintains an identity and an interest for each client node in the network, and wherein the interest comprises a set of topics to which each client node is subscribed.

8. The computer software product according to claim 6, wherein communicating the message to the content-provider node comprises executing an application service providing the message to the content-provider node for publication.

9. The computer software product according to claim 6, wherein dividing the logical segment into logical subsegments comprises defining a first logical subsegment, a second logical subsegment and a logical midpoint forming a boundary therebetween, wherein equal numbers of client nodes are found in the first logical subsegment and the second logical subsegment.

10. The computer software product according to claim 6, wherein consulting the interest-aware membership service further comprises determining a number of the subscribing client nodes in the logical segment, and wherein the step of multicasting the message from the content-provider node to instances of the new content-provider node is performed only when the number exceeds a predetermined threshold, the method further comprising unicasting the message to the subscribing client nodes in the logical segment when the number fails to exceed the predetermined threshold.

11. A method for configuring a computer-readable medium comprising:
   forming transitions in a tangible computer-readable medium, the transitions comprising digital patterns that are interpretable by a computer as instructions, wherein the instructions comprise distinct software modules, the software modules including an interest-aware membership service application module, which instructions, when executed by the computer, cause the computer to perform the steps of:

in a communications network having a structured overlay in which client nodes are interlinked to define a ring, designating one of the client nodes in a logical segment of the ring as a content-provider node;

communicating a message to the content-provider node, the message being associated with a topic;

responsively to the message, invoking the interest-aware membership service application module to identify a set of the client nodes in the logical segment as subscribing client nodes of the topic;

dividing the logical segment into logical subsegments having terminal nodes;

pruning ones of the terminal nodes that are not subscribing client nodes until the logical subsegments comprise at least one qualified logical subsegment that includes and is bounded by an outermost one of the subscribing client nodes;

recursively performing the steps of designating one of the client nodes as a new content-provider node, dividing the logical segment into logical subsegments, and pruning, using the at least one qualified logical subsegment as the logical segment; and multicasting the message from the content-provider node only to instances of the new content-provider node.

12. The method according to claim 11, wherein the interest-aware membership service application module maintains a full-view interest-aware membership service and maintains an identity and an interest for each client node in the network, and wherein the interest comprises a set of topics to which each client node is subscribed.

13. The method according to claim 11, wherein communicating the message to the content-provider node comprises executing an application service providing the message to the content-provider node for publication.

14. The method according to claim 11, wherein dividing the logical segment into logical subsegments comprises defining a first logical subsegment, a second logical subsegment and a logical midpoint forming a boundary therebetween, wherein equal numbers of client nodes are found in the first logical subsegment and the second logical subsegment.

15. The method according to claim 11, wherein invoking the interest-aware membership service application module further comprises determining a number of the subscribing client nodes in the logical segment, and wherein the step of multicasting the message from the content-provider node to instances of the new content-provider node is performed only when the number exceeds a predetermined threshold, the method further comprising unicasting the message to the subscribing client nodes in the logical segment when the number fails to exceed the predetermined threshold.

16. A data processing system for optimized message multicasting, comprising:

a processor;

a memory accessible to the processor storing programs and data objects therein, the programs including an interest-aware membership service wherein execution of the programs cause the processor to perform a method comprising the steps of:

in a communications network having a structured overlay in which client nodes are interlinked to define a ring, designating one of the client nodes in a logical segment of the ring as a content-provider node;

communicating a message to the content-provider node, the message being associated with a topic;

responsively to the message, invoking the interest-aware membership service to identify a set of the client nodes in the logical segment as subscribing client nodes of the topic;

dividing the logical segment into logical subsegments having terminal nodes;

pruning ones of the terminal nodes that are not subscribing client nodes until the logical subsegments comprise at least one qualified logical subsegment that includes and is bounded by an outermost one of the subscribing client nodes;

recursively performing the steps of designating one of the client nodes as a new content-provider node, dividing the logical segment into logical subsegments, and pruning, using the at least one qualified logical subsegment as the logical segment; and multicasting the message from the content-provider node only to instances of the new content-provider node.

17. The data processing system according to claim 16, wherein the interest-aware membership service comprises a full-view interest-aware membership service and maintains an identity and an interest for each client node in the network, and wherein the interest comprises a set of topics to which each client node is subscribed.

18. The data processing system according to claim 16, wherein communicating the message to the content-provider node comprises executing an application service providing the message to the content-provider node for publication.

19. The data processing system according to claim 16, wherein dividing the logical segment into logical subsegments comprises defining a first logical subsegment, a second logical subsegment and a logical midpoint forming a boundary therebetween, wherein equal numbers of client nodes are found in the first logical subsegment and the second logical subsegment.

20. The data processing system according to claim 16, wherein invoking the interest-aware membership service further comprises determining a number of the subscribing client nodes in the logical segment, and wherein the step of multicasting the message from the content-provider node to instances of the new content-provider node is performed only when the number exceeds a predetermined threshold, the method further comprising unicasting the message to the subscribing client nodes in the logical segment when the number fails to exceed the predetermined threshold.

* * * * *